United States Patent
Masukura et al.

(10) Patent No.: US 7,092,547 B2
(45) Date of Patent: Aug. 15, 2006

(54) IMAGE DATA PROCESSING METHOD AND ARTICLE OF MANUFACTURE

(75) Inventors: Koichi Masukura, Kawasaki (JP); Osamu Hori, Yokohama (JP); Toshimitsu Kaneko, Kawasaki (JP); Takeshi Mita, Yokohama (JP); Koji Yamamoto, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 640 days.

(21) Appl. No.: 10/259,655

(22) Filed: Sep. 30, 2002

(65) Prior Publication Data

US 2003/0063670 A1 Apr. 3, 2003

(30) Foreign Application Priority Data

Sep. 28, 2001 (JP) ............................. 2001-301362

(51) Int. Cl.
*G06K 9/00* (2006.01)

(52) U.S. Cl. ........................................ 382/103; 382/291

(58) Field of Classification Search ................ 382/100, 382/103, 107, 154, 169, 291; 375/240.09; 348/340, 625, 630, 412.1, 415.1
See application file for complete search history.

(56) References Cited

U.S. PATENT DOCUMENTS

| 5,982,909 A * | 11/1999 | Erdem et al. ................ 382/103 |
| 6,185,314 B1 * | 2/2001 | Crabtree et al. ............. 382/103 |
| 6,263,089 B1 * | 7/2001 | Otsuka et al. ............... 382/107 |
| 6,340,994 B1 * | 1/2002 | Margulis et al. ............ 348/625 |
| 6,400,831 B1 * | 6/2002 | Lee et al. .................... 382/103 |
| 6,449,382 B1 * | 9/2002 | Ciccolo et al. .............. 382/103 |
| 2003/0063670 A1 | 4/2003 | Masukura et al. |
| 2005/0280657 A1 | 12/2005 | Hori et al. |

OTHER PUBLICATIONS

U.S. Appl. No. 10/156,107, filed May 29, 2002, pending.
U.S. Appl. No. 10/259,655, filed Sep. 30, 2002, pending.
U.S. Appl. No. 09/493,192, filed Jan. 28, 2000, pending.
U.S. Appl. No. 09/612,497, filed Jul. 7, 2000, pending.
U.S. Appl. No. 09/633,231, filed Aug. 4, 2000, pending.
U.S. Appl. No. 09/808,988, filed Mar. 16, 2001, pending.
U.S. Appl. No. 09/852,620, filed May 11, 2001, pending.

* cited by examiner

*Primary Examiner*—Jingge Wu
*Assistant Examiner*—Abolfazl Tabatabai
(74) *Attorney, Agent, or Firm*—Oblon, Spivak, McClelland, Maier & Neustadt, P.C.

(57) ABSTRACT

A data processing method processes image data including spatiotemporal locator information which is added. The spatiotemporal locator information represents a spatiotemporal area which is a temporal transition of an object region over a plurality of frames. The method sets a curved surface defined by a periphery of the spatiotemporal area based on the spatiotemporal locator information, calculates time when a reference trajectory crosses the curved surface, determines whether coordinate values of the reference trajectory are inside or outside of the object region in at least one of frames in which the object region exists, and outputs information relating to whether or not the reference trajectory passes the spatiotemporal area.

18 Claims, 10 Drawing Sheets

IMAGE DATA PROCESSING METHOD AND ARTICLE OF MANUFACTURE

CROSS-REFERENCE TO RELATED APPLICATIONS

This application is based upon and claims the benefit of priority from the prior Japanese Patent Application No. 2001-301362, filed Sep. 28, 2001, the entire contents of which are incorporated herein by reference.

BACKGROUND OF THE INVENTION

1. Field of the Invention

The present invention relates to an image data processing method using spatiotemporal locator information in which a position or movement of a spatiotemporal area in an image is determined.

2. Description of the Related Art

In recent years, with a rapid development of an image processing technique, the handling of video image (a moving picture or still picture) as digital data has been generalized. By this digitization, a technique of efficiently compressing digital image data having a large data amount has been established. Moreover, with the development of network techniques such as Internet, satellite broadcast, and CATV, it has been possible to handle a large amount of image data, and an image database or a video on demand in which the image data is stored and from which the data is extracted and used to meet needs has come into a practical use stage. Additionally, an automatic monitor system from a remote site has also become major. When the image is to be used in this manner, there is a demand to recognize something in a screen, to conversely search for/extract an image including a desired object or to classify the image.

To meet this demand, the same assignee has already proposed a technique for efficiently describing a spatiotemporal locator information which is defined by a temporal trajectory of an object region over a plurality of frames (e.g., U.S. patent application Ser. No. 09/612,497 and Ser. No. 09/633,231).

When the image is searched for, extracted and classified in accordance with a position or movement of the spatiotemporal area, it is necessary to determine whether or not the spatiotemporal area satisfies predetermined conditions with respect to all the frames with the object region existing therein. Therefore, when the number of frames of the spatiotemporal area is large or when the image is searched for based on a large number of spatiotemporal areas, there is a disadvantage that a calculation amount is large and efficiency is damaged.

BRIEF SUMMARY OF THE INVENTION

The present invention is directed to an image data processing method that substantially obviates one or more of the problems due to limitations and disadvantages of the related art and aims to provide an image data processing method in which a position or movement of an object region in an image can efficiently be determined.

According to an embodiment of the present invention, there is provided a method of processing image data, comprising:

determining a curved surface defined by a temporal transition of an object region;

determining a reference trajectory which is at least a trajectory of a point which is different from the temporal transition of the object region;

determining when the reference trajectory crosses the curved surface; and outputting an indication of whether the reference trajectory crosses the curved surface.

DETAILED DESCRIPTION OF THE INVENTION

Figure 1:
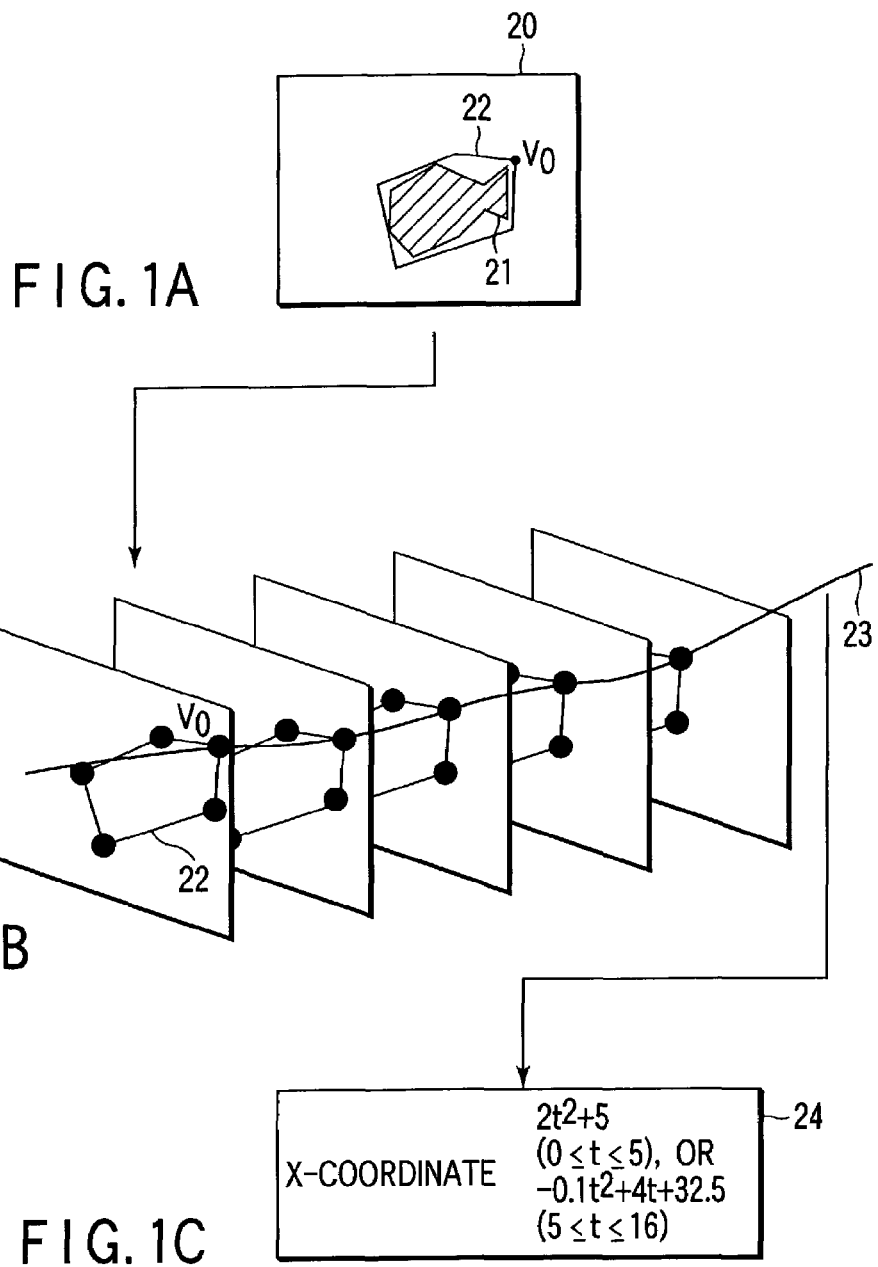
FIGS. 1A, 1B, and 1C are explanatory views showing an outline of a processing for describing a region of an object in an image with spatiotemporal locator information.

An embodiment of an image data processing method using spatiotemporal locator information according to the present invention will now be described with reference to the accompanying drawings.

FIRST EMBODIMENT

The data processing method according to the first embodiment of the present invention has a function of determining a positional relation between a spatiotemporal area as an object and a certain trajectory (hereinafter referred to as a reference trajectory), for example, determining whether the reference trajectory passes the object spatiotemporal area. In further detail, the method has a function of determining a time (time stamp, frame number, and the like) when the reference trajectory crosses the object spatiotemporal area, or whether or not the reference trajectory is inside or outside of the object spatiotemporal area.

First, the spatiotemporal locator information will briefly be described.

The contents, creation method, and use method of the spatiotemporal locator information are disclosed in detail in, e.g., U.S. patent application Ser. No. 09/612,497 or Ser. No. 09/633,231 assigned to the present assignee. The object region data disclosed in these prior applications corresponds to one form of the spatiotemporal locator information.

The contents and creation method of the spatiotemporal locator information will be briefly described.

The spatiotemporal locator information is information which represents a spatiotemporal region (e.g., temporal transition of a 2D region in each frame) from appearance to disappearance of a specific region arranged on a display window (e.g., a GUI window) for various purposes. The spatiotemporal locator information normally accompanies video data (the video data itself can have any contents such as a photorealistic image, processed data of the photorealistic image, CG, animation, or a combination thereof). Video data is assumed to be comprised of a plurality of frames (still images). In this specification, video data indicates both a moving image and a still image.

This specific region can be used as, e.g., a region (object region) that indicates a specific object in the video data. In this case, the shape of the specific region in a given frame represents (or approximately represents) the object region of the specific object in that frame. The object region means a set of region portions in a video. Any portion that can be grasped as an object, e.g., a man, animal, plant, car, building, road, river, sun, or cloud, can be handled. It may be an independent object. Alternatively, it may be part of an object (e.g., the head of a man, the bonnet of a car, or the entrance of a building) or a set of objects (e.g., a group of birds or fish).

Creation of the spatiotemporal locator information for one object region will be briefly described next with reference to FIGS. 1A, 1B, 1C, and 2.

The spatiotemporal locator information can be generally created in accordance with, e.g., the following procedures. These procedures can be automated. Alternatively, user's manual operation may be inserted.

(1) The object region of an object to be processed is extracted from a predetermined frame of video data.

(2) The object region is approximated by a predetermined figure.

(3) Representative points that specify the approximate figure are extracted.

Procedures (1) to (3) are done for all or a plurality of frames sampled from a frame in which the approximate figure for the object region appears to a frame in which the figure disappears.

(4) The time series variation of positions (or any quantity that can specify the positions) of each representative point is approximately expressed by a function (approximate function) of time $t$ (e.g., a time stamp added to the video) or frame number $f$. The value of the parameter of the function for approximate expression is used as spatiotemporal locator information. The functions are separately expressed for the representative points and also for X- and Y-coordinates.

Procedures (1) to (4) are done for each object region to be processed.

Approximate figure includes various figures such as a polygon whose number of sides is used as a parameter, a polygon such as a rectangle with a fixed number of sides, a circle, and an ellipse. In addition, various kinds of representative points can be used in accordance with the type of figure. For example, the vertexes of a polygon, four or three vertexes of a rectangle, the center of a circle and one point on its circumference or two end points of its diameter, four or three vertexes of the circumscribing rectangle of an ellipse, or two foci of an ellipse and one point on it can be used.

When the parameter of a function is stored, the function can be obtained from the parameter. The X-Y coordinate values of each representative point at desired time $t$ or frame number $f$ can be obtained based on the function. The region of the approximate figure at the desired time $t$ or frame number $f$ can be obtained from the X-Y coordinate values of each representative point.

FIGS. 1A, 1B, 1C, and 2 show an example in which a polygon is used as an approximate figure for an object region, the vertexes of the polygon are defined as representative points, and a quadratic polynomial spline function is used as an approximate function for the trajectory of each vertex in the direction of time axis, thereby creating spatiotemporal locator information for an object "fish" in an image.

Referring to FIG. 1A, reference numeral 20 denotes a frame in a video to be processed; 21, a region of an object "fish" to be extracted; and 22, an approximate polygon obtained by approximating the object region 21.

FIG. 1B expresses the representative points of the approximate figure over a plurality of frames, i.e., the approximate polygon 22 in this example and the transition of its vertexes, and the approximate curve of one vertex ($V_0$).

Reference numeral 24 in FIG. 1C denotes a function obtained for the representative point $V_0$. Here, a function for only one coordinate axis of the reference representative point $V_0$ is shown. In this example, the time period (t=0 to 16) is divided into two periods, i.e., t=0 to 5 and t=5 to 16.

Figure 2:
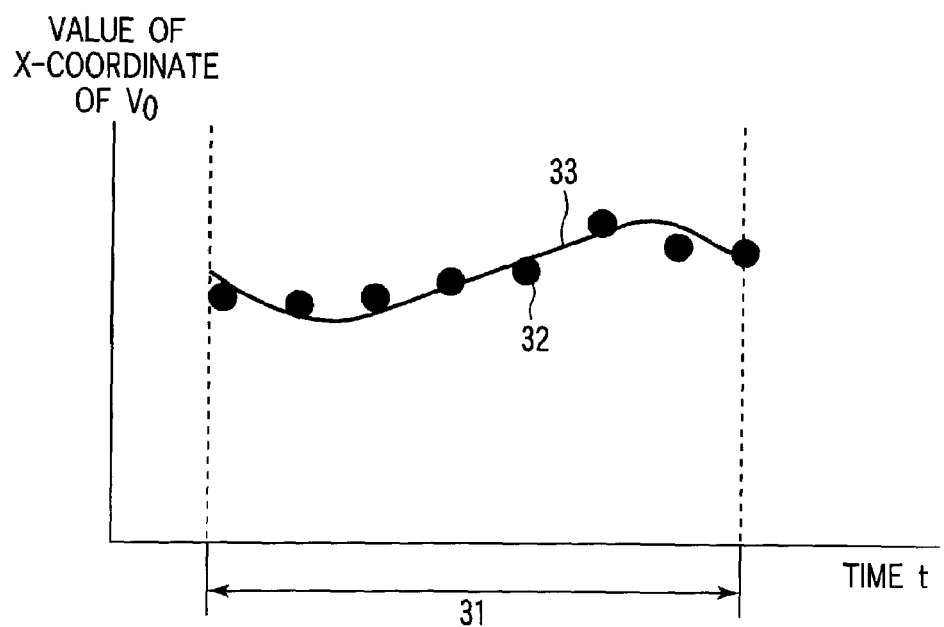
FIG. 2 is an explanatory view showing an example in which a function is obtained to approximate an X-coordinate value of a reference representative point.

FIG. 2 shows a function that approximates the X-coordinate value of the representative point $V_0$. Reference numeral 31 in FIG. 2 denotes a time period in which the object is present. Dots 32 indicate the X-coordinate values of the representative point $V_0$. Reference numeral 33 denotes an approximate function. An approximate function can also be obtained for the Y-coordinate in a similar manner. Since a polynomial spline function is used as an approximate function, a polynomial is defined for each of time periods divided by points called knots 24 in the function shown in FIG. 1C. In this case, t=0, 5, and 16 are knot times.

This also applies to representative points other than the representative point $V_0$.

Figure 3:
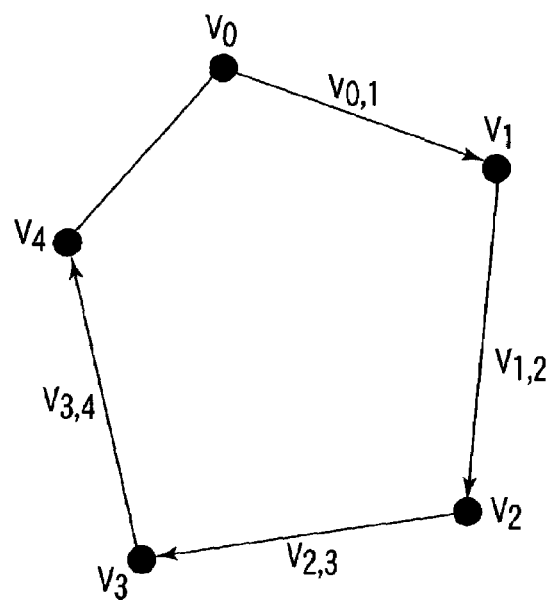
FIG. 3 is an explanatory view of one example of a difference vector for representing a representative point other than the reference representative point.
Figure 4:
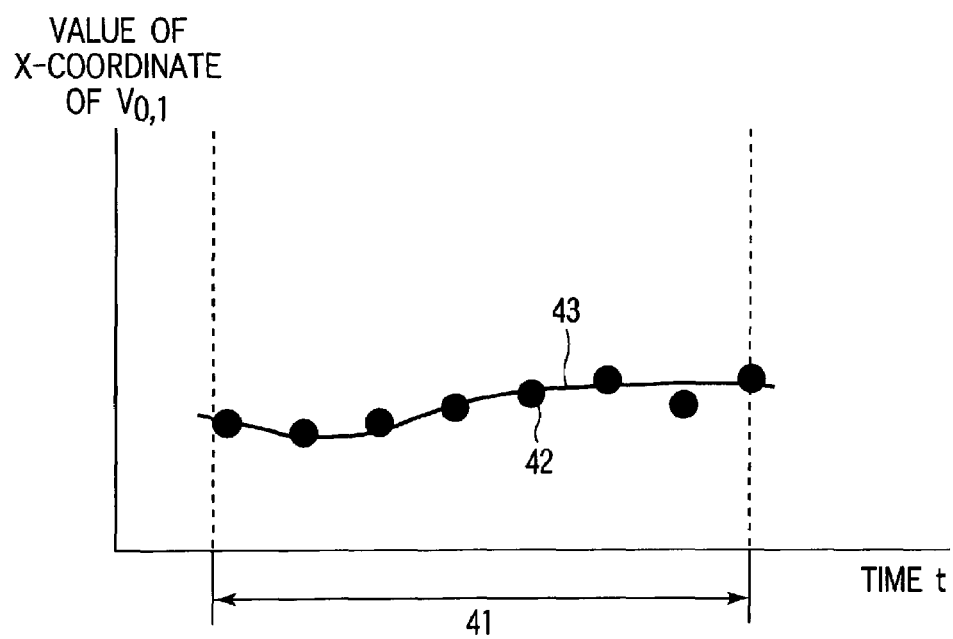
FIG. 4 is an explanatory view of an example in which a function is obtained to approximate an X component value of the difference vector for representing the representative point other than the reference representative point.

For each representative point other than the representative point $V_0$, it may be expressed by a relative relationship from another representative point, e.g., a difference vector and described by the trajectory of the vector, instead of describing the representative point using absolute coordinates. FIG. 3 is a view for explaining the reference representative point $V_0$ and difference vectors that indicate the remaining representative points. Dots 42 in FIG. 4 indicates the values of the X component of a difference vector $V_{0,1}$ at the respective times.

In the above description, the trajectory of the position of the representative point or the trajectory of the difference vector is approximated for each frame. Instead, a trajectory of a parameter of a function that converts a representative point position or a difference vector in a given reference frame into a representative point position or a difference vector in each frame may be approximated. Alternatively, a trajectory of a parameter of a function that converts a representative point position or a difference vector in a given frame into a representative point position or a difference vector in a succeeding frame may be approximated.

The form (description form) of the spatiotemporal locator information has various variations. The present invention can be applied to spatiotemporal locator information in any form.

In some cases, predetermined attribute information or related information is added to the spatiotemporal locator information for a predetermined unit, e.g., for each frame and each representative point corresponding to each object region, or for each object region and each frame, for each representative point of each object region, or for each object region. The present invention can also be applied to such spatiotemporal locator information.

Figure 5:
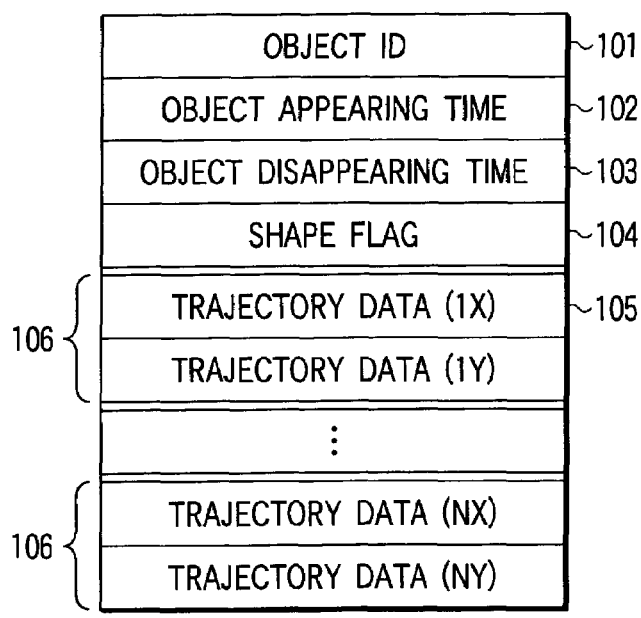
FIG. 5 is a diagram showing one example of a data structure of the spatiotemporal locator information.

FIG. 5 shows an example of the data structure of the spatiotemporal locator information to be used for the description of this embodiment. As shown in FIG. 5, the spatiotemporal locator information of this example is described for each object region and contains spatiotemporal locator identification information (to be referred to as an "object ID" hereinafter) 101, object appearing time 102, object disappearing time 103, a shape flag 104, and trajectory data 105.

The object ID 101 is an identification number assigned to each spatiotemporal region.

The object appearing time 102 and object disappearing time 103 indicate times between which the spatiotemporal region assigned the object ID is present. The object appearing time and object disappearing time may be expressed by time stamps or frame numbers.

The shape flag 104 indicates how the region shape (approximate figure) is expressed. Since a region shape is expressed by, e.g., a rectangle, ellipse, or polygon, information capable of uniquely discriminating between them is described. For a polygon, information representing the number of vertexes is also added to the shape flag.

The trajectory data 105 is parameter data at each representative point and expresses the spatiotemporal region. With this data, the spatiotemporal region shape from the object appearing time to the object disappearing time can be determined. For example, when a region has a rectangular or polygonal shape, a parameter obtained by approximating the trajectory of each vertex by a function is used. When a region has an elliptical shape, a parameter obtained by approximating, by a function, the trajectory of each vertex of the circumscribing rectangle of the ellipse is used. Since the trajectory data 105 are separately described for X- and Y-coordinate trajectories per representative point, as indicated by reference numeral 106, N (the number of representative points)×2 trajectory data are present.

Figure 6:
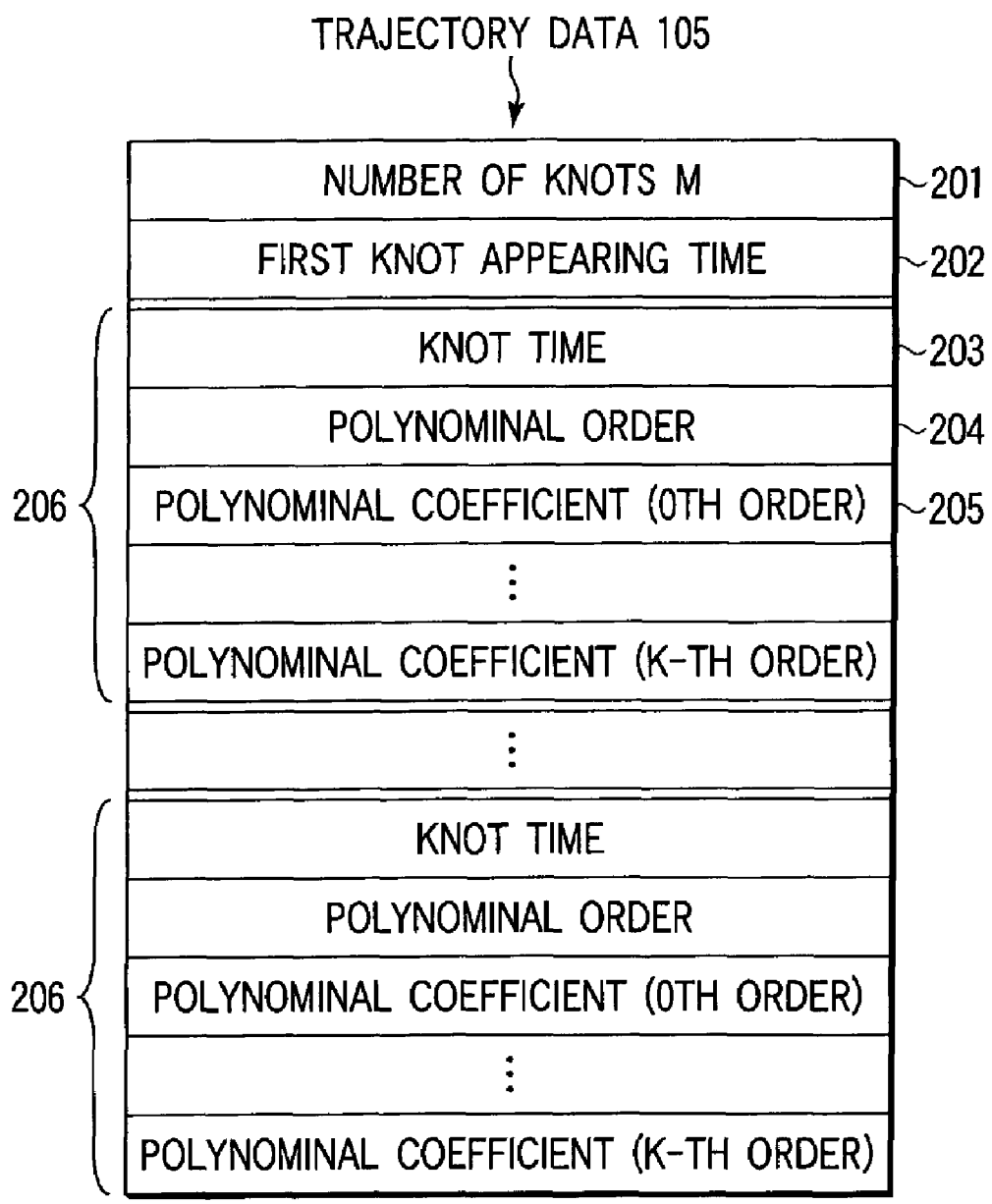
FIG. 6 is a diagram showing one example of the data structure of trajectory data.

FIG. 6 shows an example of the data structure of each trajectory data 105 in the spatiotemporal locator information shown in FIG. 5. This represents a continuous trajectory interpolated by, e.g., a spline function and stores the relationship between time and a parameter such as an X-coordinate or Y-coordinate.

A numeral 201 of knots represents a number M of knots of a spline function. This indicates that (M−1) polynomial data 206 are present. Since a spline function is expressed by different polynomials for the respective intervals between adjacent knots, polynomials whose number corresponds to the number of knots are necessary. Hence, the plurality of data 206 each containing a knot time, polynomial order, polynomial coefficients, and the like are repeatedly described.

First knot appearing time 202 represents the time of the first knot of the spline function.

Knot time 203 represents the knot time of the end of the polynomial data 206. This means that the polynomial data 206 is effective until this knot time. The knot time 203 may be described by a frame number or a time stamp. The number of polynomial coefficient data 205 changes depending on the highest order of the spline function (letting K be the highest order, the number of coefficient data 205 is K+1). For this reason, the number of coefficient data 205 is stored in a polynomial order 204. The polynomial order 204 is followed by polynomial coefficient data 205 whose number equals the number of polynomial orders+1.

Information relating to "reference trajectory" for performing a passage judgment with respect to the spatiotemporal area can be represented using the data structure of the trajectory data of FIG. 6. Additionally, the data structure of the trajectory data in the spatiotemporal locator information of FIG. 5 may be different from the data structure of the reference trajectory.

Moreover, a method of designating the reference trajectory may be a method of reading information of the reference trajectory from the outside, a method of using a predetermined tool to describe the information of the reference trajectory by a user, a method of generating the information of the reference trajectory based on the trajectory drawn on a GUI screen by the user in a spatiotemporal manner, or any other method.

A constitution example of the spatiotemporal locator processing system of the present embodiment will be described hereinafter in detail.

Here, an example in which the spatiotemporal locator information shown in FIGS. 5 and 6 is used to perform passage judgment will be described.

Figure 7:
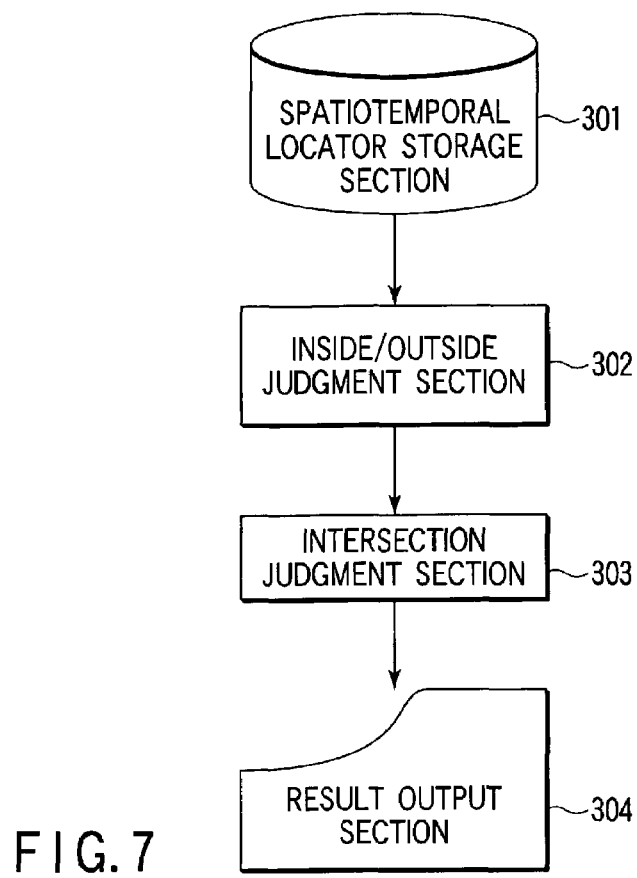
FIG. 7 is a diagram showing a constitution example of a spatiotemporal locator processing system utilizing an image data processing method according to a first embodiment of the present invention.

FIG. 7 shows a constitution example of the spatiotemporal locator processing system based on the data processing method according to the present embodiment. As shown in FIG. 7, the spatiotemporal locator processing system includes a spatiotemporal locator information storage 301, inside/outside judgment section 302, intersection judgment section 303, and result output section 304.

The spatiotemporal locator processing system can be realized in the form of execution of program on a computer. It is also possible to incorporate the program as one function of another software. Furthermore, if necessary, software such as an OS or driver software including the desired function, software for packet communication, and cryptography software, or hardware such as a communication interface apparatus, external storage apparatus, and input/output apparatus can be mounted on or connected to the computer.

The spatiotemporal locator information storage 301 stores the spatiotemporal locator information represented by the trajectory of each vertex of an approximate rectangle or polygon, the trajectory of each vertex of the rectangle circumscribed about the approximate ellipse, and the like, and is constituted, for example, of a hard disk, optical disk, semiconductor memory, and the like.

The inside/outside judgment section 302 extracts the object region in a period of time during which the object region exists, calculates the shape of the object region in the frame, and performs an inside/outside judgment of the reference trajectory for performing the passage judgment with the coordinate values of the calculated shape. Additionally, the inside/outside judgment section 302 is arranged preceding to the intersection judgment section 303 in FIG. 7, but may also be arranged succeeding to the intersection judgment section 303, or may also be executed as an independent process in parallel with the intersection judgment section 303.

The predetermined frame to be extracted may be any frame, as long as the spatiotemporal area exists. For example, the front frame of a plurality of frames in which the object region exists may be used for ease of obtaining the area shape.

When the object region is represented by the rectangle, coordinates p1 to p4 of four vertexes of the approximate rectangle of the frame are obtained. When the object region is represented by the polygon, coordinates $p_1$ to $p_N$ (N: the number of vertexes) of all the vertexes of the approximate polygon of the frame are obtained. When the object region is represented by the rectangle circumscribed about the ellipse, coordinates $p_1$ to $p_4$ of the circumscribed rectangle vertexes of the approximate rectangle of the frame are obtained, and the parameters of the ellipse such as a center point of the ellipse, length of long/short diameter, and inclination are obtained.

When the coordinate in the frame of the reference trajectory for performing the passage judgment is r, the inside/outside judgment of the object region of the frame and the coordinate r of the reference trajectory is performed, for example, as follows.

Figure 8:
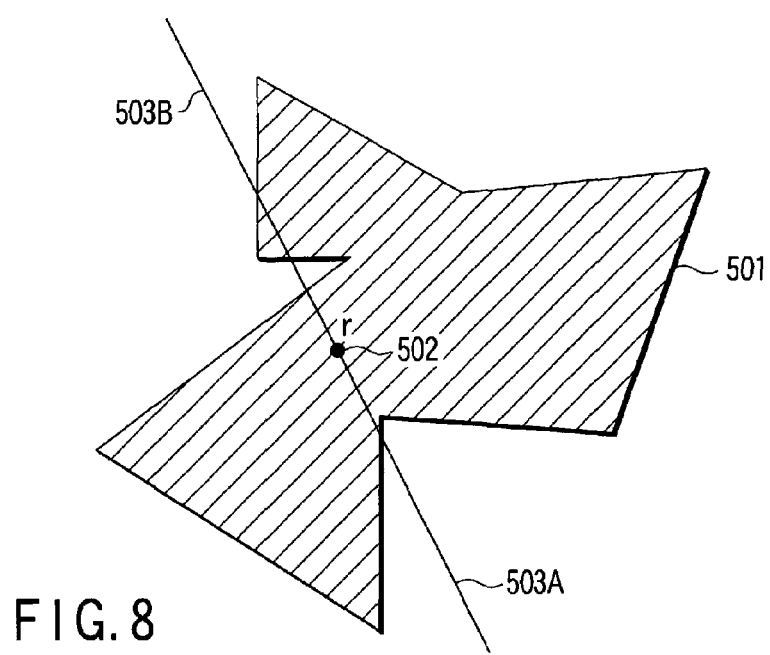
FIG. 8 is a diagram showing one example of an inside/outside judgment method of a polygon and coordinate.

(1) When the object region is the rectangle or polygon:

As shown in FIG. 8, the inside/outside judgment of a polygon 501 indicating the object region and the coordinate r (502) in the frame of the reference trajectory is performed. In this case, there are a large number of inside/outside judgment algorithms, and any method may be used. For example, a half line (intersecting with the polygon) is drawn from the coordinate r, and the number of intersections of the half line with the outer periphery of the polygon 501 is detected. When the number is odd, the coordinate r is inside of the polygon. With the even number of intersections, the coordinate is outside of the polygon. In the example of FIG. 8, when a half line 503A in a lower right position is used, the line intersects with the periphery once (a half line 503B in an upper left position intersects three times). Therefore, it is determined that the coordinate r exists inside of the polygon 501 (i.e., the object region).

Figure 9:
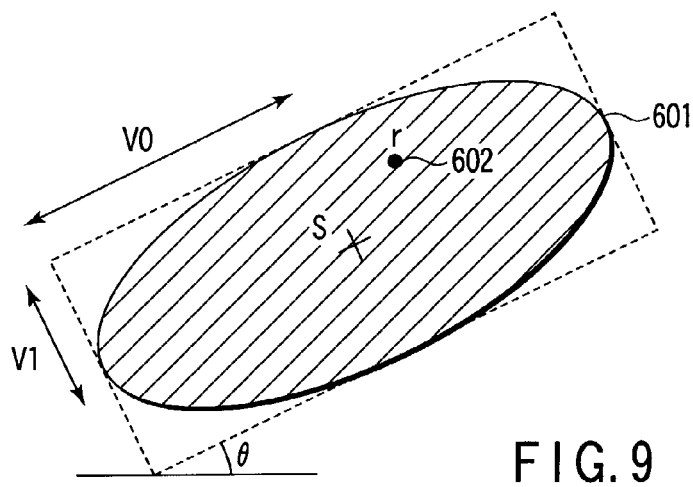
FIG. 9 is a diagram showing one example of the inside/outside judgment method of an ellipse and coordinate.

(2) When the object region is the ellipse:

As shown in FIG. 9, the inside/outside judgment of an ellipse 601 indicating the object region and the coordinate r (602) in the frame of the reference trajectory is performed. In this case, there are a large number of inside/outside judgment algorithms, and any method may be used. In the example of FIG. 9, assuming that the center point of the ellipse 601 is $S=(S_x, S_y)$, lengths of two axes of the ellipse measured from the center point S are $V_0$, $V_1$, and a rotation angle is $\theta$, a point (x, y) inside of the ellipse can be represented as follows.

$$P \times (x-S_x)^2 + Q \times (x-S_x) \times (y-S_y) + R \times (y-S_y)^2 \leq 1$$

Here, $$P=(\cos\theta/V_0)^2+(\sin\theta/V_1)^2$$

$$Q=2\times\sin\theta\times\cos\theta\times(1/V_0^2-1/V_1^2)$$

$$R=(\sin\theta/V_0)^2+(\cos\theta/V_1)^2$$

When the coordinate 602 of r is assigned to (x, y), and inequality is established, r is found to be inside of the ellipse. When the inequality is not established, r is found to be outside of the ellipse. In the example of FIG. 9, the above-described inequality is established, and it is determined that the coordinate r exists inside of the ellipse (i.e., the object region).

Additionally, when the vertex vectors of the circumscribed rectangle of the ellipse are $p_1$ to $p_4$ ($p_M=(p_{Mx}, p_{My})$), a center point vector of the ellipse is represented by $S=(S_x, S_y)$, the lengths of two axes of the ellipse measured from the center point S are $V_0$, $V_1$, and a rotation angle $\theta$ can be represented as follows (additionally, $\sin\theta$ and $\cos\theta$ are obtained with respect to the rotation angle).

$$S=(p_1+p_3)/2$$

$$V_0=|p_2-p_1|/2$$

$$V_1=|p_3-p_2|/2$$

$$\sin\theta=(p_{2y}-p_{1y})/(2\times V_0)$$

$$\cos\theta=(p_{2x}-p_{1x})/(2\times V_0)$$

Of course, there are various inside/outside judgment methods in accordance with the shape of the approximate figure for approximating the object region or the representation method, and any inside/outside judgment method may be used. Additionally, the inside/outside judgment is described, for example, in "Mathematical Principle of Graphics", authored by Kokichi Sugihara, Kyoritsu Shuppan Co., 1995, pp. 87 to 92.

The intersection judgment section 303 performs the intersection judgment of a curved surface in which the outer periphery of the spatiotemporal area extends and the reference trajectory. This comprises representing the outer periphery of the spatiotemporal area as a mathematical formula, and solving an equation with a mathematical formula representing the reference trajectory.

When the area shape is the ellipse, one curved surface with the whole ellipse outer periphery extending therein may be represented by one formula (the whole ellipse outer periphery may also be represented by a plurality of formulas). When the area shape is the rectangle or polygon, each curved surface with each side extending therein is represented by the formula. When trajectory data of each vertex for representing the spatiotemporal area is represented by the spline function, the curved surface is divided for each space between the knots of the spline function and represented by the formula.

When the same knot frame is used for the trajectory data of all vertexes, and when the spatiotemporal area is the ellipse, the spatiotemporal area can be represented by (the number of knots−1) curved surfaces. When the spatiotemporal area is the rectangle, the spatiotemporal area can be represented by (the number of knots−1)×4 curved surfaces. When the spatiotemporal area is the polygon, the spatiotemporal area can be represented by (the number of knots−1)× (the number of vertexes) curved surfaces. Additionally, in a certain frame, when a certain vertex is the knot in the frame, but another vertex is not the knot, the frame is regarded as the frame of the vertex trajectory including no knot with the knot added thereto, and the curved surface can be divided.

When the curved surface with the outer periphery of the spatiotemporal area extending therein is represented by a plurality of curved surfaces, the judgment of the intersection is performed with respect to all the curved surfaces.

It can be determined whether one curved surface (one curved surface in a case in which the outer periphery of the spatiotemporal area is represented by only one curved surface or individual curved surfaces in a case in which the outer periphery of the spatiotemporal area is represented by a plurality of curved surfaces) crosses the reference trajectory, for example, as follows.

Figure 10:
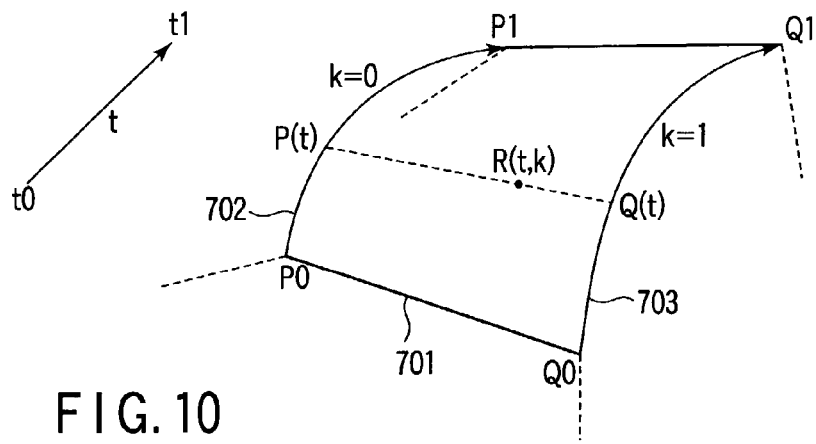
FIG. 10 is a diagram showing an intersection judgment method of the trajectory designated as a trajectory of one side of a rectangle or polygon.

(1) When the area shape is the rectangle or polygon:

As shown in FIG. 10, trajectories 702, 703 of the vertex vectors of opposite ends of a side 701 in the rectangle or polygon indicating the spatiotemporal area are represented as P(t), Q(t) by the function of the time t. Moreover, knot times of opposite ends of the curved surface are $t_0$, $t_1$. In this case, a point R on the curved surface can be represented using a parameter k.

$$R(t, k) = P(t) + k \times (Q(t) - P(t))$$

Additionally, $t_0 \leq t \leq t_1$, $0 \leq k \leq 1$

When the reference trajectory vector is the function of the time r(t), the curved surface crosses the trajectory at time $t_1$ if the following equation is satisfied:

$$R(t, k) = r(t)$$

where, $t_0 \leq t \leq t_1$, $0 \leq k \leq 1$

Therefore, the following may be solved with respect to t, k.

$$P(t) + k \times (Q(t) - P(t)) - r(t) = 0$$

$$P(t) = (P_x(t), P_y(t))$$

$$Q(t) = (Q_x(t), Q_y(t))$$

$$r(t) = (r_x(t), r_y(t))$$

Then, the followings are obtained, and there comes a problem that simultaneous equations of t, k are solved.

$$P_x(t) + k \times (Q_x(t) - P_x(t)) - r_x(t) = 0$$

$$P_y(t) + k \times (Q_y(t) - P_y(t)) - r_y(t) = 0$$

Where k is deleted, the following is obtained.

$$(r_x(t) - P_x(t)) \times (Q_y(t) - P_y(t)) - (r_y(t) - P_y(t)) \times (Q_x(t) - P_x(t)) = 0$$

When each trajectory is represented by an n-th order function, the above equation is a (2×n)-th order equation. This may be solved by a formula of solution. Moreover, with a high-order equation, a numeric value solution may be obtained by Newton method. Furthermore, k is evaluated regarding a solution of $t_0 \leq t \leq t_1$. With $0 \leq k \leq 1$, the curved surface intersects with the reference trajectory in a time of the solution.

Also when each trajectory is an arbitrary nonlinear function, and if the above equation can be solved by the Newton method, the intersection judgment can be performed using the present technique.

Figure 11:
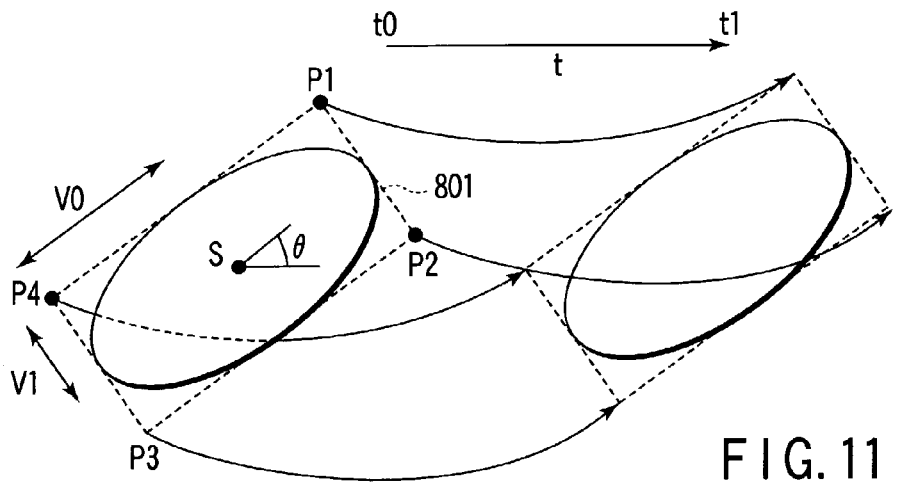
FIG. 11 is a diagram showing the intersection judgment method of the trajectory designated as a trajectory of an ellipse outer periphery.

(2) When the area shape is the ellipse:

As shown in FIG. 11, it is assumed that the trajectory for the time t of the center point vector of an ellipse 801 indicating the spatiotemporal area is $S(t)=(S_x(t), S_y(t))$, the trajectories of the lengths of two axes of the ellipse are $V_0(t)$, $V_1(t)$, and the trajectory of the rotation angle is $\theta(t)$. Here, it is assumed that the trajectories of the vertex vectors of the circumscribed rectangle of the ellipse are $p_1(t)$ to $p_4(t)$ ($p_M(t)=p_{Mx}(t)$, $p_{My}(t)$ is assumed). Moreover, the knot times of the opposite ends of the curved surface are $t_0$, $t_1$.

$$p_{21x}(t) = p_{2x}(t) - p_{1x}(t)$$

$$p_{21y}(t) = p_{2y}(t) - p_{1y}(t)$$

$$p_{32x}(t) = p_{3x}(t) - p_{2x}(t)$$

$$p_{32y}(t) = p_{3y}(t) - p_{2y}(t)$$

Then, the followings are obtained.

$$S(t) = (p_1(t) + p_3(t))/2$$

$$V_0(t)^2 = \{p_{21x}(t)^2 + p_{21y}(t)^2\}/4$$

$$V_1(t)^2 = \{p_{32x}(t)^2 + p_{32y}(t)^2\}/4$$

$$\sin\theta(t) = p_{21y}(t)/(2 \times V_0(t))$$
$$= p_{32x}(t)/(2 \times V_1(t))$$
$$\cos\theta(t) = p_{21x}(t)/(2 \times V_0(t))$$
$$= p_{32y}(t)/(2 \times V_1(t))$$

Equations representing the trajectory of the outer periphery of the ellipse are as follows.

$$P(t) = (\cos\theta(t)/V_0(t))^2 + (\sin\theta(t)/V_1(t))^2$$

$$Q(t) = 2 \times \sin\theta(t) \times \cos\theta(t) \times (1/V_0(t)^2 - 1/V_1(t)^2)$$

$$R(t) = (\sin\theta(t)/V_0(t))^2 + (\cos\theta(t)/V_1(t))^2$$

Then, the following is obtained.

$$P(t) \times (x - S_x(t))^2 + Q(t) \times (x - S_x(t)) \times (y - S_y(t)) + R(t) \times (y - S_y(t))^2 = 1 \quad (1)$$

where, $t_0 \leq t \leq t_1$

When a reference trajectory vector is represented by a function of time $r(t)=(r_x(t), r_y(t))$, $(x, y)=(r_x(t), r_y(t))$, and t satisfying the equation (1) exists, the ellipse outer periphery crosses the reference trajectory in the time.

Therefore, the followings are obtained.

$$r_{sx}(t) = r_x(t) - S_x(t)$$

$$r_{sy}(t) = r_y(t) - S_y(t)$$

Then, the following may be solved.

$$P(t) \times r_{sx}(t)^2 + Q(t) \times r_{sx}(t) \times r_{sy}(t) + R(t) \times r_{sy}(t)^2 = 1 \quad (2)$$

where, $t_0 \leq t \leq t_1$

P(t), Q(t), R(t) may be modified as follows.

$$P(t)=4\times(p_{21y}(t)^2+p_{32y}(t)^2)/\{(p_{32x}(t)^2+p_{32y}(t)^2)\times(p_{21x}(t)^2+p_{21y}(t)^2)\}$$

$$Q(t)=8\times(p_{32x}(t)\times p_{32y}(t)-p_{21x}(t)\times p_{21y}(t))/\{(p_{32x}(t)^2+p_{32y}(t)^2)\times(p_{21x}(t)^2+p_{21y}(t)^2)\}$$

$$R(t)=4\times(p_{21x}(t)^2+p_{32x}(t)^2)/\{(p_{32x}(t)^2+p_{32y}(t)^2)\times(p_{21x}(t)^2+p_{21y}(t)^2)\}$$

Thereby, the equation (2) can be organized as follows.

$$4\times(p_{21y}(t)\times r_{sx}(t)-p_{21x}(t)\times r_{sy}(t))^2+4\times(p_{32y}(t)\times r_{sx}(t)+p_{32x}(t)\times r_{sy}(t))^2-(p_{32x}(t)^2+p_{32y}(t)^2)\times(p_{21x}(t)^2+p_{21y}(t)^2)=0 \quad (3)$$

where, $t_0 \leq t \leq t_1$

When the vertex trajectory and reference trajectory of the outer rectangle are represented by an n-th order function, the equation (3) is a (4×n)-th order equation. This may be solved by the formula of solution. Moreover, with the high-order equation, the numeric value solution may be obtained by the Newton method. When the solution $t_0 \leq t \leq t_1$ exists, the curved surface crosses the reference trajectory in the time of the solution.

Also when each trajectory is an arbitrary nonlinear function, and the equation (3) can be solved by the Newton method, the intersection judgment can be performed using the present method.

The result output section 304 outputs the result of the passage judgment of the spatiotemporal area and reference trajectory based on the information obtained by the inside/outside judgment section 302 and intersection judgment section 303. The result may be outputted any device such as a display, hard disk and network interface. Moreover, when the present system is program operating on the computer, the result of the passage judgment may be outputted to another process operating on the same computer.

The passage judgment is performed, for example, by the following procedure.

First, the intersection judgment section 303 performs the intersection judgment between the reference trajectory and all the curved surfaces representing the outer periphery of the spatiotemporal area as the object. Thereby, all intersection times $t_1$ to $t_k$ are obtained with respect to the outer periphery of the spatiotemporal area and reference trajectory. With respect to an example shown in FIG. 12, time $t_1$ is obtained as an intersection time.

Here, when the reference trajectory is inside of the spatiotemporal area, for example, in a period of time from $t_i$ to $t_{i+1}$, the reference trajectory can be supposed to be outside of the spatiotemporal area in adjacent periods of time from $t_{i-1}$ to $t_i$ and from $t_{i+1}$ to $t_{i+2}$. Conversely, if the reference trajectory is outside of the spatiotemporal area in a period of time from $t_i$ to $t_{i+1}$, the reference trajectory can be supposed to be inside of the spatiotemporal area in adjacent periods of time from $t_{i-1}$ to $t_i$ and from $t_{i+1}$ to $t_{i+2}$. That is, it is found that the reference trajectory is inside or outside of the spatiotemporal area in a certain period of time. Then, it is found that the reference trajectory is inside or outside of the spatiotemporal area in any period of time. Therefore, it is unnecessary to perform the inside/outside judgment for each frame (period of time), a calculation amount may be small, and a calculation time is reduced.

Therefore, the inside/outside judgment section 302 knows that the reference trajectory is inside or outside of the spatiotemporal area in the predetermined frame (e.g., the first frame) within a period of time in which the spatiotemporal area exists (it is assumed that the period starts at $t_s$ and ends at $t_e$). With respect to the example shown in FIG. 12, the reference trajectory is inside of the spatiotemporal area in the first frame ts.

Then, the result output section 304 specifies that the reference trajectory is inside or outside of the spatiotemporal area with respect to periods $t_s$ to $t_1$, $t_1$ to $t_2$, . . . , $t_{k-1}$ to $t_k$, $t_k$ to $t_e$, given from the intersection time $t_1$ to $t_k$ obtained by the intersection judgment section 303 based on the inside/outside judgment result in the frame obtained by the inside/outside judgment section 302. Therefore, in the case of the example of FIG. 12, it is determined that the reference trajectory is inside the spatiotemporal area from time $t_s$ to time $t_1$.

However, the intersection judgment section 303 does not obtain any intersection time, that is, the reference trajectory does not cross the spatiotemporal area. Then, the inside/outside judgment section 302 determines, for example, that the first frame is inside. Then, it is found that the reference trajectory is always inside of the spatiotemporal area in all the periods $t_s$ to $t_e$ of the spatiotemporal area. If it is determined that the first frame is outside, it is found that the reference trajectory is always outside of the spatiotemporal area in all the periods $t_s$ to $t_e$ of the spatiotemporal area.

As the passage judgment result, for example, a set of a start time or end time of the period, and information indicating that the reference trajectory is inside/outside in the period can be enumerated and represented.

Additionally, for example, the coordinate indicating the position in which the reference trajectory crosses the spatiotemporal area in the intersection time may also be obtained, included in the passage judgment result and outputted.

Moreover, predetermined evaluation values such as a ratio of a time in which the reference trajectory exists inside of the spatiotemporal area to a time in which the spatiotemporal area exists may also be obtained, included in the passage judgment result and outputted.

Additionally, the result output section 304 may also be constituted to output the information obtained by the inside/outside judgment section 302 (e.g., the inside/outside judgment result in the top frame) and information obtained by the intersection judgment section 303 (e.g., the intersection times $t_1$ to $t_k$) as such.

Figure 13:
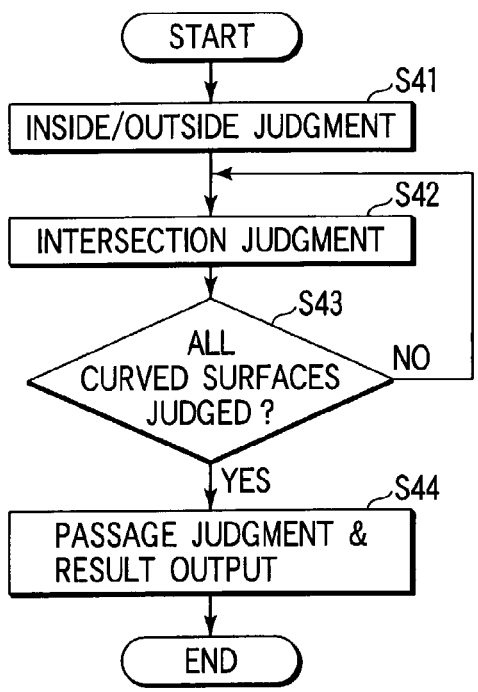
FIG. 13 is a flowchart showing a processing procedure of the spatiotemporal locator processing system according to the first embodiment.

FIG. 13 shows one example of a processing procedure in the present data processing method. As shown in FIG. 13, the present data processing method includes step S41 of performing the inside/outside judgment in one arbitrary frame, step S42 of performing the intersection judgment, step S43 of determining whether all the curved surfaces are subjected to the intersection judgment step S42, and step S44 of performing the passage judgment processing and outputting the result.

Additionally, as described above, step S41 may also be performed after a loop processing of steps S42 and S43, and step S41 may also be performed in parallel with the loop processing of steps S42 and S43.

Step S41 comprises extracting the predetermined frame in a time in which the object region exists, calculating the shape of the object region in the frame, and performing the inside/outside judgment of the calculated shape with reference to the coordinate of a reference trajectory in the frame for performing the passage judgment.

Step S42 comprises determining whether the curved surface obtained by dividing the curved surface with the outer periphery of the spatiotemporal area extending therein by the knot and each side of the vertex trajectory intersects with the reference trajectory.

Step S43 comprises determining whether or not all the divided curved surfaces are subjected to the intersection judgment. The processing loops until the intersection judgment is completed with respect to all the curved surfaces, and ends, when the intersection judgment is completed with respect to all the curved surfaces.

Step S42 is executed (the number of knots−1) times, for example, when the spatiotemporal area is ellipse. Step S42 is executed (the number of knots−1)×4 times, when the region is rectangle. Step S42 is executed (the number of knots−1)×(the number of vertexes) times, when the region is polygon.

Step S44 is step of outputting the result. This step outputs the information obtained by steps S42 to S44 in accordance with a request. The result may be outputted to any device such as a display and hard disk.

Additionally, a modification is also possible for obtaining a passage judgment result (whether or not the reference trajectory exists inside of the object region in one frame) which is simpler than that in the above-described processing example (for determining the time when the reference trajectory enters or goes out of the object region).

For example, there is a method of determining only whether the reference trajectory intersects with the object region and outputting the result. In this case, even when only one intersection time is obtained, it is found that the reference trajectory crosses the object region. Therefore, it is first determined whether or not there is at least one intersection time (e.g., the method comprises successively obtaining the intersections of the respective curved surfaces with the reference trajectory, and ending the processing, when the first intersection is obtained). It is found that at least one intersection time exists. In this case, the inside/outside judgment is unnecessary. If it is found that there is not any intersection time (e.g., the intersection time is not obtained with respect to all the curved surfaces), the inside/outside judgment is performed. When the inside is determined, the reference trajectory is found to cross the object region. When the outside is determined, the reference trajectory is found not to cross the object region.

Moreover, a plurality of passage judgment methods may be prepared, and may appropriately be selectively used, for example, in accordance with the purpose. For example, a detailed passage judgment method and simple passage judgment method are prepared. If all the intersection times at which the reference trajectory crosses the object region are necessary, the detailed method is used. If only the information indicating whether or not the reference trajectory crosses the object region is necessary, the simple method may be used. Moreover, for example, when there are a large number of object regions, first only the object region intersecting with the reference trajectory is extracted by the simple method, only the extracted object region is used as the object, and the passage judgment processing is performed in detail with respect to the reference trajectory by the detailed method.

According to the present embodiment, there is provided a method for processing image data including spatiotemporal locator information which is added in order to represent a spatiotemporal area which is a temporal transition of an object region of an image over a plurality of frames, the method comprising setting a curved surface defined by a periphery of the spatiotemporal area based on the spatiotemporal locator information; calculating a time when a reference trajectory crosses the curved surface; determining whether coordinate values of the reference trajectory are inside or outside of the object region in a frame in which the object region exists; and outputting information relating to whether or not the reference trajectory passes the spatiotemporal.

The inside/outside determination is performed in a front frame of the plurality of frames in which the object region exists.

If the reference trajectory crosses the curved surface once and the coordinate values of the reference trajectory are inside of the object region in the front frame, information representing that the reference trajectory passes the spatiotemporal area in a period of time from the start time of the plurality of frames to the time when the reference trajectory crosses the curved surface is output. If the reference trajectory crosses the curved surface once and coordinate values of the reference trajectory are outside of the object region in the front frame, information representing that the reference trajectory passes the spatiotemporal area in a period of time from the time when the reference trajectory crosses the curved surface to the last time of the plurality of frames is output.

Times $t_i$ (i=1 to n; n is an integer) is calculated when the reference trajectory crosses the curved surface.

The inside/outside determination is performed in a front frame corresponding to a start time $t_s$ of the plurality of frames in which the object region exists.

If the reference trajectory crosses the curved surface a plurality of times and the coordinate values of the reference trajectory are inside of the object region in the front frame, information representing that the reference trajectory passes the spatiotemporal area in every other periods of time is output in which the first period of time starts at the start time $t_s$ and ends at time $t_1$. If the reference trajectory crosses the curved surface a plurality of times and the coordinate values of the reference trajectory are outside of the object region in the front frame, information representing that the reference trajectory passes the spatiotemporal area in every other periods of time is output in which the first period of time starts at time $t_1$ and ends at time $t_2$.

The inside/outside determination is performed in a front frame of the plurality of frames in which the object region exists.

If the reference trajectory does not cross the curved surface and the coordinate values of the reference trajectory are inside of the object region in the front frame, information representing that the reference trajectory passes the spatiotemporal area is output. If the reference trajectory does not cross the curved surface and the coordinate values of the reference trajectory are outside of the object region in the front frame, information representing that the reference trajectory does not pass the spatiotemporal area is output.

The time calculation ends when the first time is calculated and the information representing that the reference trajectory passes the spatiotemporal area is output.

The inside/outside determination is performed when the reference trajectory does not cross the curved surface.

Information representing that the reference trajectory passes the spatiotemporal area is output when the coordinate values of the reference trajectory are inside of the object region. Information representing that the reference trajectory does not pass the spatiotemporal area is output when the coordinate values of the reference trajectory are outside of the object region.

The temporal transition of the object region is divided into a plurality of periods, and the time calculation is performed for every period.

The spatiotemporal locator information identifies a temporal trajectory of a representative point of an approximate figure of the object region.

The spatiotemporal locator information is described using a parameter of a predetermined function which approximates a trajectory of position data of the representative point of an approximate figure of the object region arranged with a progress of the frame.

The approximate figure is either a rectangle or a polygon.

Supposing that the trajectory of the representative point of the approximate figure (e.g., vertexes of a rectangle circumscribed or inscribed about the approximate figure, approximate polygon, or approximate ellipse) and the designated reference trajectory are continuous in all times with the object region existing therein. When a curved surface intersects with the designated reference trajectory in intersection judgment with respect to the curved surface with an outer periphery of the spatiotemporal area extending therein and the designated reference trajectory, the trajectory designated in the intersection time changes to the outside from the inside of the object region or to the inside from the outside. The designated reference trajectory exists inside or outside of the object region in all the times with the object region existing therein. In this case, it is possible to determine whether the designated reference trajectory exists inside or outside of the object region in all the times with the object region existing therein by the inside/outside judgment of the region in one arbitrary frame with the object region existing therein and the coordinate in the frame of the designated reference trajectory. When all region transform parameters to the spatiotemporal area in each frame from a reference region are continuous, the trajectory with each vertex moving by the region transform parameter therein is also continuous. Therefore, it is possible to calculate the vertex trajectory beforehand and apply each processing.

Figure 12:
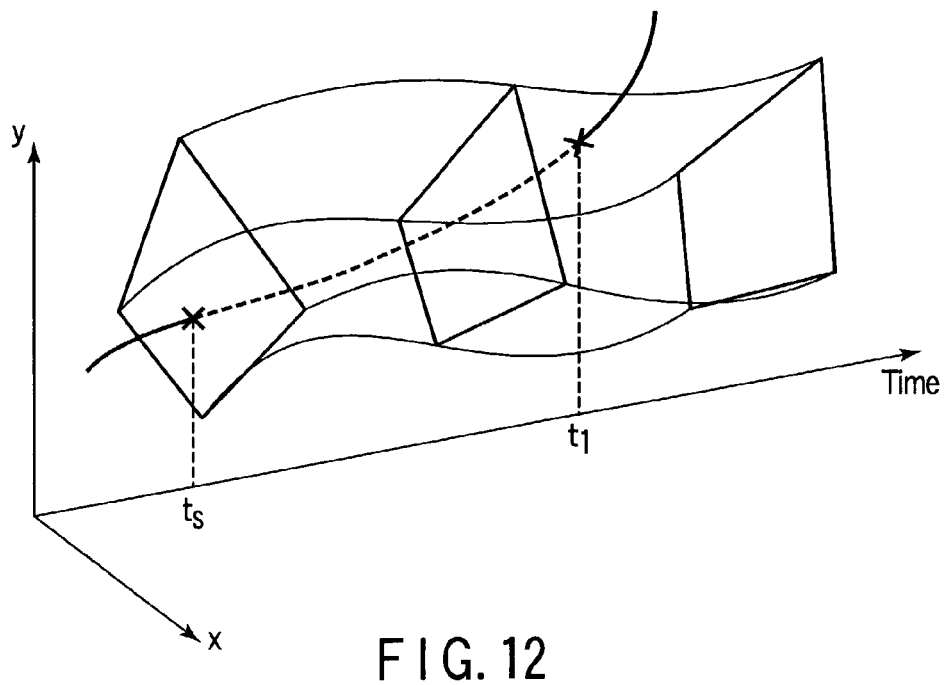
FIG. 12 shows a principle of an inside/outside judgment and intersection judgment.
Figure 14:
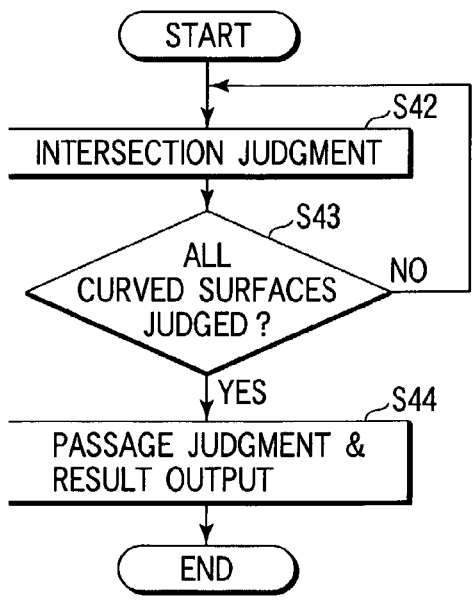
FIG. 14 is a flowchart showing a processing procedure of the spatiotemporal locator processing system according to a first modification of the first embodiment.
Figure 15:
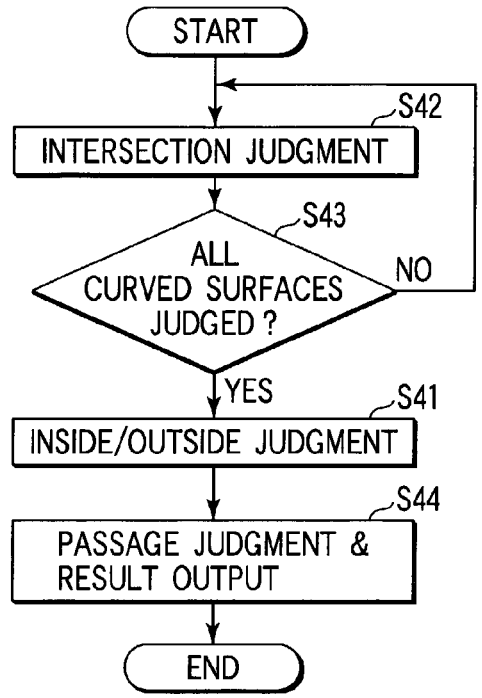
FIG. 15 is a flowchart showing a processing procedure of the spatiotemporal locator processing system according to a second modification of the first embodiment.

In the procedure shown in FIG. 12, both of the curved surface intersection judgment and the inside/outside judgment are performed. However, it is possible to skip the omit the inside/outside judgment and perform only the curved surface intersection judgment, as shown in FIG. 14. Even if both of the curved surface intersection judgment and the inside/outside judgment are performed, it is possible to reverse the order of the inside/outside judgment and curved surface intersection judgment, as shown in FIG. 15. In FIG. 15, step S42 (curved surface intersection judgment step) is first performed and it is determined in step S43 whether or not all the divided curved surfaces are subjected to the intersection judgment. Step S42 is repeatedly performed until the intersection judgment is completed with respect to all the curved surfaces. When the intersection judgment is completed with respect to all the curved surfaces, step S41 (inside/outside judgment in one arbitrary frame) is performed. Then, the passage judgment and result output are performed in step S44.

According to the first embodiment, it is unnecessary to perform the inside/outside judgment with respect to all the frames in which the object region exists, different from a conventional art, and it is possible to efficiently perform the passage judgment of the spatiotemporal area and designated reference trajectory at a high speed.

Other embodiments of the data processing method according to the present invention will be described. The same portions as those of the first embodiment will be indicated in the same reference numerals and their detailed description will be omitted.

SECOND EMBODIMENT

In a second embodiment, a case in which the present invention is applied to the spatiotemporal locator information of a data structure different from that of FIG. 5 will be described. Additionally, in the second embodiment, mainly a respect different from that of the first embodiment will be described.

In the first embodiment, the trajectory of the representative point whose position data is arranged along the progress of the frame is approximated with the predetermined function, and the spatiotemporal locator information is described using the parameter of the function. This has been described as the example. In the second embodiment, an example will be described for obtaining a transform parameter indicating region transform to the position data in another frame from the position data in the frame as a reference of the representative point, approximating the trajectory of the time when the transform parameter is arranged along the progress of the frame with the predetermined function with respect to the transform parameter, and describing the spatiotemporal locator information using the parameter of the function.

Figure 16:
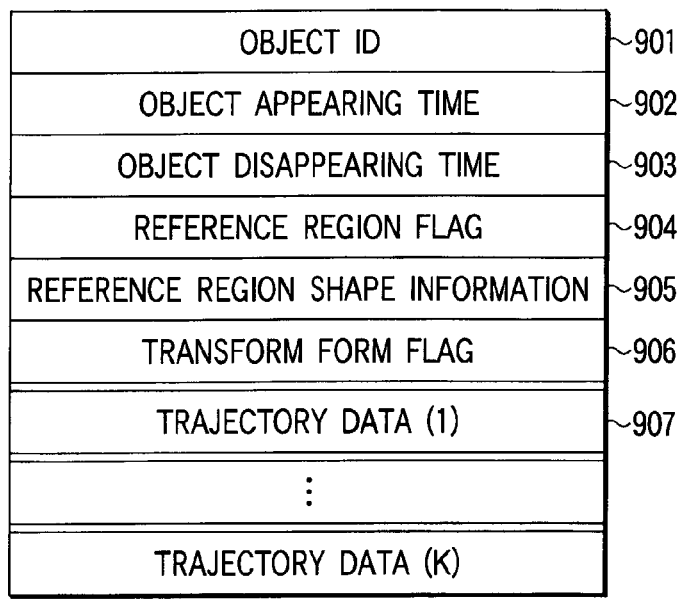
FIG. 16 is a diagram showing one example of the data structure of the spatiotemporal locator information according to a second embodiment of the present invention.

FIG. 16 shows another example of the data structure of the spatiotemporal locator information. As shown in FIG. 16, the spatiotemporal locator information of this example includes an ID number 901, first time (object appearing time) 902, last time (object disappearing time) 903, reference region flag 904, reference region shape information 905, transform form flag 906, and trajectory data 907.

The ID number 901, first time 902, and last time 903 have meanings equivalent to those of the object ID 101, first time 102, and last time 103 of FIG. 5.

The reference region flag 904 indicates the representation of the shape of the reference region. The shape of the reference region is represented, for example, by the rectangle, ellipse, polygon, and the like, and therefore information for uniquely distinguishing the shape is described. With the polygon, the vertex number information is added to the reference region flag 904.

The reference region shape information 905 stores the reference region shape. For example, when the reference region shape is the rectangle or polygon, and the coordinate of each vertex and reference region shape are ellipses, the parameters such as the vertex coordinate of the circumscribed rectangle, center point, and lengths of long/short axes are stored.

The transform form flag 906 indicates the form of the transform parameter indicating the region transform to the spatiotemporal locator information in each frame from the reference region. Examples of the form of the transform parameter indicating the region transform include parallel movement, primary transform, affine transform, and the like, and therefore the information for uniquely distinguishing the form is described.

The trajectory data 907 describes the trajectories of the transform parameters indicating the region transform to the spatiotemporal locator information in each frame from the reference region. For example, the trajectory data 907 includes the data structure of the trajectory data 105 shown in FIG. 6. In many cases, there are a plurality of transform parameters. Therefore, the number of trajectory data 907 corresponding to the number of transform parameters is described. The number of the trajectory data is uniquely determined by the transform form flag 906. For example, the number is two for the parallel movement, four for the primary transform, and six for the affine transform. The order of the trajectory data is determined beforehand in accordance with the meaning of the transform parameter, for example, as follows.

When the trajectory data of the parameter as the function of the time t are arranged as $z_1(t), z_2(t), \ldots$, the trajectory of a point $p=(p_x, p_y)$ on the reference region is transformed to a trajectory $P(t)=(P_x(t), P_y(t))$ by the region transform, and the followings are obtained.

1: during the parallel movement $$P_x(t)=p_x+z_1(t)$$

$$P_y(t)=p_y+z_2(t)$$

2: during the primary transform $$P_x(t)=p_x \times z_1(t)+p_y \times z_2(t)$$

$$P_y(t)=p_x \times z_3(t)+p_y \times z_4(t)$$

3: during the affine transform $$P_x(t)=p_x \times z_1(t)+p_y \times z_2(t)+z_3(t)$$

$$P_y(t)=p_x \times z_4(t)+p_y \times z_5(t)+z_6(t) \qquad (4)$$

When the trajectory data of the parameters $z_1(t), z_2(t), \ldots$ are represented by an n-th order polynomial equation, it is also possible to represent $P_x(t)$, $P_y(t)$ by the n-th order polynomial equation from the above equations.

Additionally, the reference region for performing the passage judgment with respect to the spatiotemporal area can be represented, for example, using the data structure of the trajectory data of FIG. 6. Additionally, the data structure of the trajectory data in the spatiotemporal locator information of FIG. 16 may be different from the data structure of the reference region.

The constitution example of the spatiotemporal locator processing system of the second embodiment will be described hereinafter in detail.

Here, an example in which the spatiotemporal locator information of FIGS. 16 and 6 is the object of the passage judgment will be described.

Figure 17:
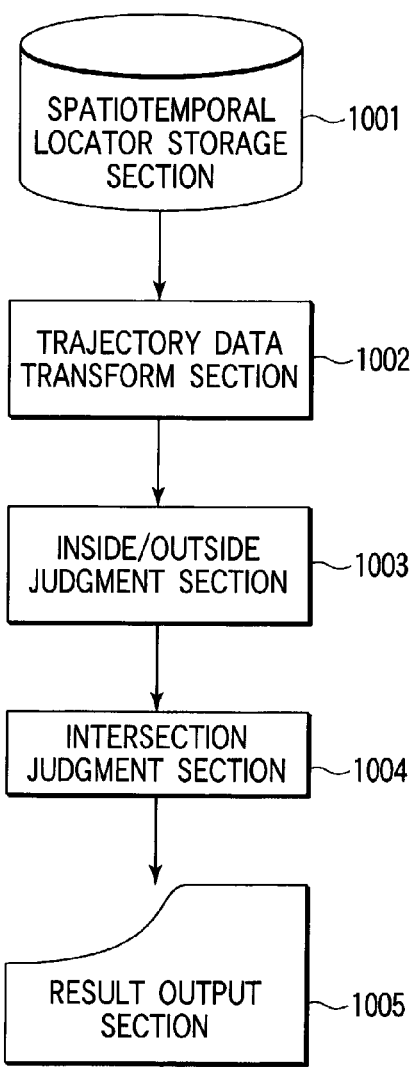
FIG. 17 is a diagram showing a constitution example of the spatiotemporal locator processing system utilizing an image data processing method according to the second embodiment.

FIG. 17 shows the constitution example of the spatiotemporal locator processing system based on the data processing method according to the second embodiment.

As shown in FIG. 17, the spatiotemporal locator processing system includes a spatiotemporal locator information storage 1001, trajectory data transform section 1002, inside/outside judgment section 1003, intersection judgment section 1004, and result output section 1005.

The spatiotemporal locator information storage 1001 stores the spatiotemporal locator information described by the reference region and the transform parameter indicating the region transform to the spatiotemporal locator information in the frame from the reference region, and is constituted, for example, of a hard disk, optical disk, semiconductor memory, and the like.

The trajectory data transform section 1002 transforms the spatiotemporal locator information described by the reference region and the transform parameter indicating the region transform to the spatiotemporal locator information in the frame from the reference region to the spatiotemporal locator information (i.e., the spatiotemporal locator information (FIGS. 5 and 6) of the first embodiment) represented by the trajectory of each vertex of the approximate rectangle or approximate polygon or the trajectory of each vertex of the rectangle circumscribed about the approximate ellipse.

Since the reference region is represented by the rectangle, polygon, ellipse, and the like, for the rectangle and polygon, the coordinate of the trajectory of each vertex is obtained by the trajectory of the transform parameter indicating the region transform. For the ellipse, the trajectory of each vertex coordinate of the circumscribed rectangle transformed by the trajectory of the transform parameter indicating the region transform is obtained. The vertex $P=(P_x, P_y)$ on a reference region is converted to the vertex $P(t)=(P_x(t), P_y(t))$ through the region transform. The vertex $P(t)=(P_x(t), P_y(t))$ can be calculated by equation (4). Therefore, if the trajectory connecting these vertexes is described by the n-th order spline function, the trajectory of each vertex transformed by the trajectory data transform section 1002 is an n-th order spline function.

The trajectory data transform section 1002, inside/outside judgment section 1003, intersection judgment section 1004, and result output section 1005 have functions equivalent to those of the spatiotemporal locator information storage 301, inside/outside judgment section 302, intersection judgment section 303, and result output section 304 in FIG. 7, respectively. The spatiotemporal locator information transformed by the trajectory data transform section 1002 includes information equivalent to the spatiotemporal locator information in the first embodiment. The second embodiment is different from the first embodiment in that the inside/outside judgment section 1003 and intersection judgment section 1004 of the second embodiment do not process the spatiotemporal locator information stored in the spatiotemporal locator information storage 1001 as the object, but process the spatiotemporal locator information transformed by the trajectory data transform section 1002 as the object.

That is, in the second embodiment, the trajectory data transform section 1002 transforms the spatiotemporal locator information described by the reference region and the transform parameter indicating the region transform to the spatiotemporal locator information in the frame from the reference region to the spatiotemporal locator information represented by the trajectory of each vertex of the approximate rectangle or the approximate polygon, the trajectory of each vertex of the rectangle circumscribed about the approximate ellipse, and the like. Thereafter, the processing similar to that of the first embodiment is performed.

Figure 18:
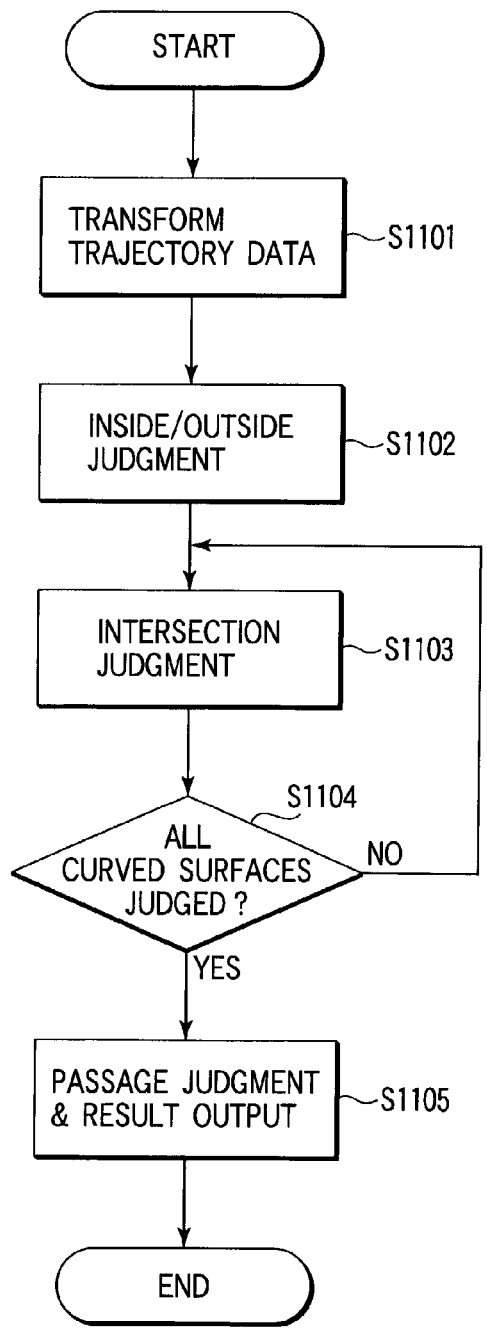
FIG. 18 is a flowchart showing the processing procedure of the spatiotemporal locator processing system utilizing an image data processing method according to the second embodiment.

FIG. 18 shows one example of the processing procedure in the data processing method. As shown in FIG. 18, the present processing method comprises step S1101 of transform the trajectory data, step S1102 of performing the inside/outside judgment in one arbitrary frame, step S1103 of performing the intersection judgment, step S1104 of determining whether the intersection judgment step S1103 is executed with respect to all the curved surfaces, and step S1105 of performing the passage judgment processing and outputting the result.

Additionally, as described above, step S1102 may be performed after a loop processing of steps S1103 and S1104, and step S1102 may be performed in parallel with the loop processing of steps S1103 and S1104.

Step S1101 comprises transforming the spatiotemporal locator information described by the reference region and the transform parameter indicating the region transform to the spatiotemporal locator information in the frame from the reference region to the spatiotemporal locator information represented by the trajectory of each vertex of the approximate rectangle or polygon, the trajectory of each vertex of the rectangle circumscribed about the approximate ellipse, and the like.

Steps S1102 to S1105 are similar to steps S41 to S44 of the first embodiment (FIG. 13).

According to the second embodiment, even the spatiotemporal locator information described by the reference region and the transform parameter indicating the region transform to the spatiotemporal locator information in the frame from the reference region can be edited similarly as the spatiotemporal locator information described as the trajectory of each representative point.

According to the present invention, the spatiotemporal locator processing system can also handle the spatiotemporal locator information of other data structures.

For example, for a certain representative point or a plurality of representative points of the approximate figure, as shown in FIGS. 5 and 6, the trajectory of the representative point whose position data is arranged along the progress of the frame is approximated with the predetermined function, and described using the parameter of the function. For the other representative points, another representative point in the same frame is used as a reference, and the trajectory of the representative point whose data indicating the relative position (e.g., the difference vector) is arranged along the progress of the frame is approximated with the predetermined function, and described using the parameter of the function. The spatiotemporal locator information is transformed to the spatiotemporal locator information represented by the trajectory of each vertex of the approximate rectangle or polygon, the trajectory of each vertex of the rectangle circumscribed about the approximate ellipse, and the like by the trajectory data transform section 1002. Thereafter, the spatiotemporal locator information may be processed.

Moreover, for example, for one representative point or a plurality of representative points of the approximate figure, as shown in FIG. 16, the transform parameter indicating the region transform to the position data in another frame from the position data in the frame as the reference of the representative point is obtained. For the transform parameter, the trajectory of the transform parameter arranged along the progress of the frame is approximated with the predetermined function, and described using the parameter of the function. For the other representative points, another representative point in the same frame is used as the reference, and the trajectory of the data (e.g., difference vector) indicating the relative position of the representative point and arranged along the progress of the frame is approximated with the predetermined function, and described using the parameter of the function. The spatiotemporal locator information is also transformed to the spatiotemporal locator information represented by the trajectory of each vertex of the approximate rectangle or polygon, the trajectory of each vertex of the rectangle circumscribed about the approximate ellipse, and the like by the trajectory data transform section 1002. Thereafter, the spatiotemporal locator information may be processed.

Moreover, the spatiotemporal locator processing system can also handle the spatiotemporal locator information of a plurality of types of data structures. In this case, the identification information for identifying the data structure is added to the spatiotemporal locator information. To process the spatiotemporal locator information, the spatiotemporal locator processing system may refer to the identification information to specify the data structure, and perform the processing in accordance with the data structure.

Figure 19:
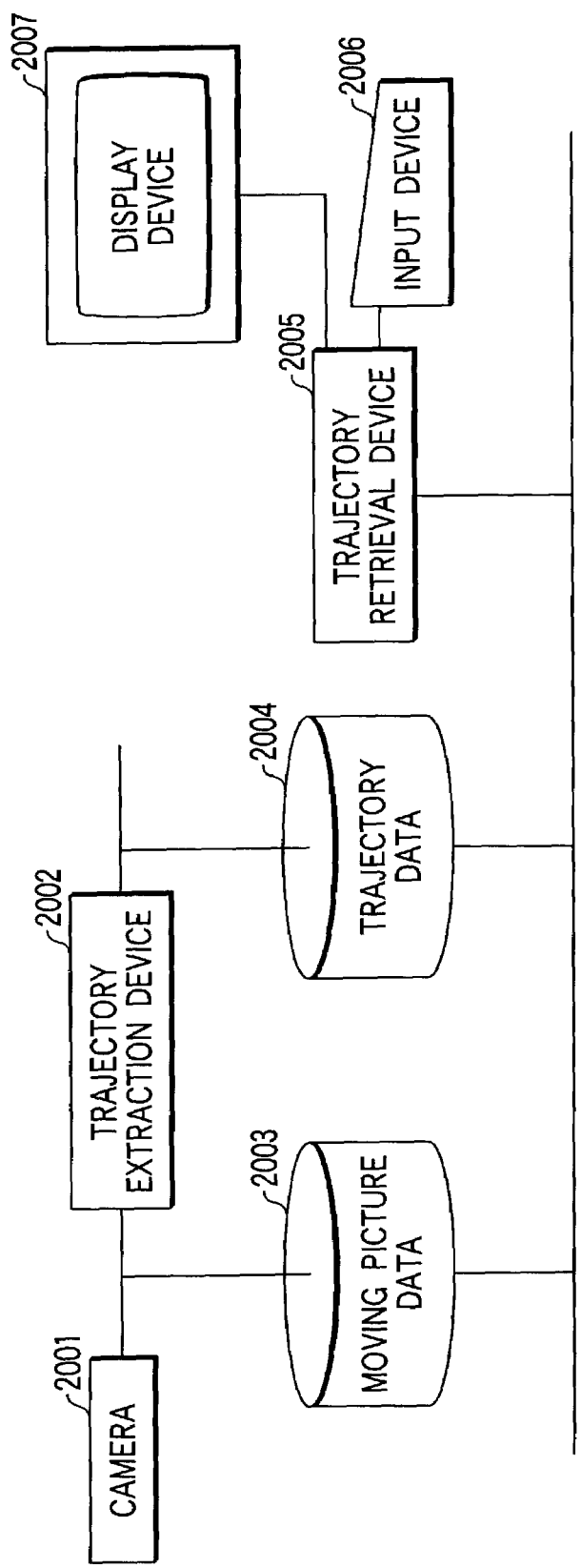
FIG. 19 shows a monitoring system utilizing an image data processing method according to embodiments of the present invention.

FIG. 19 shows a monitoring system utilizing an image data processing according to the above embodiments. This monitoring system comprises a camera 2001, trajectory extraction device 2002, moving picture data storage 2003, trajectory data storage 2004, trajectory data retrieval device 2005, input device 2006, and display device 2007. Each device is connected by a network each other. A moving picture data input from the camera 2001 is stored in the moving picture data storage 2003 as well as sent to the trajectory extraction device 2002.

The trajectory extraction device 2002 extracts trajectory data of an object region in the moving picture data. Any region can be used as an object region provided that the region is recognized as one group, e.g., a man, car, or cloud. The object region may be part of an object (e.g., the head of a man or the light of a car) or a set of objects (e.g., a group of peoples or a tailback).

An example of extracting the trajectory data of the object region from the moving picture data includes a background subtraction method in which a predetermined background image is prepared and a difference between the background image and the input image is calculated so that the difference becomes the object region. The extracted trajectory data is stored in the trajectory data storage 2004.

The trajectory retrieval device 2005 searches for, based on a reference trajectory input from the input device 2006, trajectory data which is stored in the satisfies the trajectory data storage 2004 and satisfies a predetermined condition. The retrieved trajectory data is displayed on the display device 2007. If the corresponding moving picture data stored in the moving picture data storage 2003 is also displayed, it is possible to know the details of the retrieved object.

In this monitoring system, if the monitoring area includes an off-limits area, it is possible to find an object which entered the off-limits area by setting the reference trajectory is within the off-limits area. Since it is possible to calculates a time period during which a reference area is present within the object region, it is further possible to find a car which parked at a predetermined location over a predetermined time period. Thus, this monitoring system can realize a variety of monitoring methods which are not realized by a conventional system.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein. For example, the present invention can also be implemented as a computer program for allowing a computer to execute predetermined means.

What is claimed is:

1. A method of processing image data, comprising:
determining a curved surface defined by a temporal transition of an object region in video data over a plurality of frames, the transition of the object being presented by a spatiotemporal locator specifying trajectories of representative points of an approximate figure representing the object, the spatiotemporal locator being defined for each object and including identification information of the object,
an object appearing time representing a time at which the object appears, an object disappearing time representing a time at which the object disappears, a shape flag representing a shape of the approximate figure, and trajectory data representing the trajectories of the representative points, the trajectory data for each representative point including a number of knots of a function approximating the trajectory of the representative point, a first knot appearing time representing a time of a first knot of the function, and polynomial data representing parts of function between two knots, each polynomial data including a knot time representing an end knot time, a polynomial order representing an order of the parts of function, and polynomial coefficient data representing coefficients of a polynomial representing the function;

determining a reference trajectory which is at least a trajectory of a point which is different from the temporal transition of the object region;

determining when the reference trajectory crosses the curved surface; and outputting an indication of whether the reference trajectory crosses the curved surface.

2. A method according to claim 1, wherein:

the step of determining a curved surface comprises determining a plurality of curved surfaces in order to define a three-dimensional representation of the temporal transition of the object region;

the step of determining when the reference trajectory crosses the curved surface comprises determining when the reference trajectory crosses any of the plurality of curved surfaces; and the step of outputting comprises outputting an indication of whether the reference trajectory crosses any of the plurality of curved surfaces.

3. A method according to claim 2, further comprising:

determining whether at least one coordinate value of the reference trajectory is inside or outside of the object region in at least one frame.

4. A method according to claim 3, wherein:

the step of determining whether the at least one coordinate value of the reference trajectory is inside or outside of the object region in at least one frame is performed prior to performing the step of determining when the reference trajectory crosses the curved surface.

5. A method according to claim 3, wherein:

the step of determining whether the at least one coordinate value of the reference trajectory is inside or outside of the object region in at least one frame is performed after performing the step of determining when the reference trajectory crosses the curved surface.

6. A method according to claim 1, wherein the step of determining when a reference trajectory crosses the curved surface comprises:

determining a time at which the reference trajectory crosses the curved surface.

7. A method according to claim 1, wherein the step of determining a curved surface defined by a temporal transition of an object region comprises:

determining the curved surface defined by a temporal transition of an object region by determining a temporal trajectory of a representative point of an approximate shape of the object region.

8. A method according to claim 7, wherein the temporal trajectory of the representative point of the approximate shape of the object region is defined by a parameter of a predetermined function which approximates the temporal trajectory of the representative point of the approximate shape of the object region.

9. A method according to claim 1, wherein the step of determining a curved surface defined by a temporal transition of an object region comprises:

determining the curved surface defined by a temporal transition of an object region using reference position information of the representative point of the approximate shape of the object region in a reference frame, arid a parameter of a function which approximates a temporal trajectory of a motion parameter representing a motion from the reference position information to position information of the representative point in another frame.

10. A computer readable medium storing a program for performing steps comprising:

determining a curved surface defined by a temporal transition of an object region in video data over a plurality of frames, the transition of the object being presented by a spatiotemporal locator specifying trajectories of representative points of an approximate figure representing the object, the spatiotemporal locator being defined for each object and including identification information of the object, an object appearing time representing a time at which the object appears, an object disappearing time representing a time at which the object disappears, a shape flag representing a shape of the approximate figure, and trajectory data representing the trajectories of the representative points, the trajectory data for each representative point including a number of knots of a function approximating the trajectory of the representative point, a first knot appearing time representing a time of a first knot of the function, and polynomial data representing parts of function between two knots, each polynomial data including a knot time representing an end knot time, a polynomial order representing an order of the parts of function, and polynomial coefficient data representing coefficients of a polynomial representing the function;

determining a reference trajectory which is at least a trajectory of a point which is different from the temporal transition of the object region;

determining when the reference trajectory crosses the curved surface; and outputting an indication of whether the reference trajectory crosses the curved surface.

11. The computer readable medium according to claim 10, wherein:

the step of determining a curved surface a curved surface comprises determining a plurality of curved surfaces in order to define a three-dimensional representation of the temporal transition of the object region;

the step of determining when the reference trajectory crosses the curved surface comprises determining when the reference trajectory crosses any of the plurality of curved surfaces; and the step of outputting comprises outputting an indication of whether the reference trajectory crosses any of the plurality of curved surfaces.

12. The computer readable medium according to claim 11, further comprising:

determining whether at least one coordinate value of the reference trajectory is inside or outside of the object region in at least one frame.

13. The computer readable medium according to claim 12, wherein:

the step of determining whether the at least one coordinate value of the reference trajectory is inside or outside of the object region in at least one frame is executed prior to executing the the step of determining when the reference trajectory crosses the curved surface.

14. The computer readable medium according to claim 12, wherein:

the step of determining whether the at least one coordinate value of the reference trajectory is inside or outside of the object region in at least one frame is executed after executing the the step of determining when the reference trajectory crosses the curved surface.

15. The computer readable medium according to claim 10, wherein the the step of determining when a reference trajectory crosses the curved surface comprises:

determining a time at which the reference trajectory crosses the curved surface.

16. The computer readable medium according to claim 10, wherein the step of determining a curved surface defined by a temporal transition of an object region comprises:

determining the curved surface defined by a temporal transition of an object region by determining a temporal trajectory of a representative point of an approximate shape of the object region.

17. The computer readable medium according to claim 16, wherein the temporal trajectory of the representative point of the approximate shape of the object region is defined by a parameter of a predetermined function which approximates the temporal trajectory of the representative point of the approximate shape of the object region.

18. The computer readable medium according to claim 10, wherein the the step of determining a curved surface defined by a temporal transition of an object region comprises:

determining the curved surface defined by a temporal transition of an object region using reference position information of the representative point of the approximate shape of the object region in a reference frame, and a parameter of a function which approximates a temporal trajectory of a motion parameter representing a motion from the reference position information to position information of the representative point in another frame.

* * * * *